March 21, 1950 S. F. WINCHELL 2,501,298
MACHINE TOOL
Filed Aug. 2, 1946 2 Sheets-Sheet 1

INVENTOR.
STERLING F. WINCHELL
BY
Kwis Hudson Boughton & Williams
ATTORNEYS

March 21, 1950   S. F. WINCHELL   2,501,298
MACHINE TOOL

Filed Aug. 2, 1946   2 Sheets-Sheet 2

INVENTOR.
STERLING F. WINCHELL
BY
Kurs Hudson Boughton & Williams
ATTORNEYS

Patented Mar. 21, 1950

2,501,298

UNITED STATES PATENT OFFICE 2,501,298

MACHINE TOOL

Sterling F. Winchell, East Cleveland, Ohio, assignor to The Warner & Swasey Company, Cleveland, Ohio, a corporation of Ohio Application August 2, 1946, Serial No. 688,040

9 Claims. (Cl. 74—424.8)

This invention relates to a machine tool, particularly to a tool of the type known to the trade as a "precision threading and tapping machine," and has as its principal object to provide an improved means to more accurately control the feeding movement of the spindle during the threading operation.

As will be understood by those skilled in this art, the speed and accuracy with which threading and tapping may be performed is primarily dependent upon the accurate engagement of the threaded guide members or fingers with the threaded leader on the tapping machine spindle and the maintenance of both of these fingers in firm and accurate engagement with the threaded leader under substantially equal predetermined pressures. Therefore, another object of the invention is to provide an improved actuating means for the guide fingers whereby they may be moved into and held in engagement with the threaded leader on the spindle with substantially equal predetermined pressures.

A further object of the invention is to provide an improved apparatus of the character mentioned in which the guide finger actuating means comprises levers and a toggle linkage whereby the guide fingers are positively and continually urged, with an equalized pressure, into engagement with the spindle.

A still further object of the invention is to provide an improved apparatus of the character referred to in which a spring is employed as a part of the motion transmission means, between the means for supporting the guide fingers and the means for moving the same, thus cushioning the operation of the guide finger moving means and maintaining the guide fingers in engagement with the threaded leader under a uniform, predetermined pressure.

It is also an object of the invention to provide an improved apparatus of the character referred to in which guide means are employed for the toggle linkage connecting the guide finger arms whereby the guide fingers will have an equalized movement and engage the spindle with an equal predetermined pressure when actuated.

Other advantages and objects of the invention will become apparent hereinafter during the detailed description of the illustrated embodiment of the invention.

Figure 1:
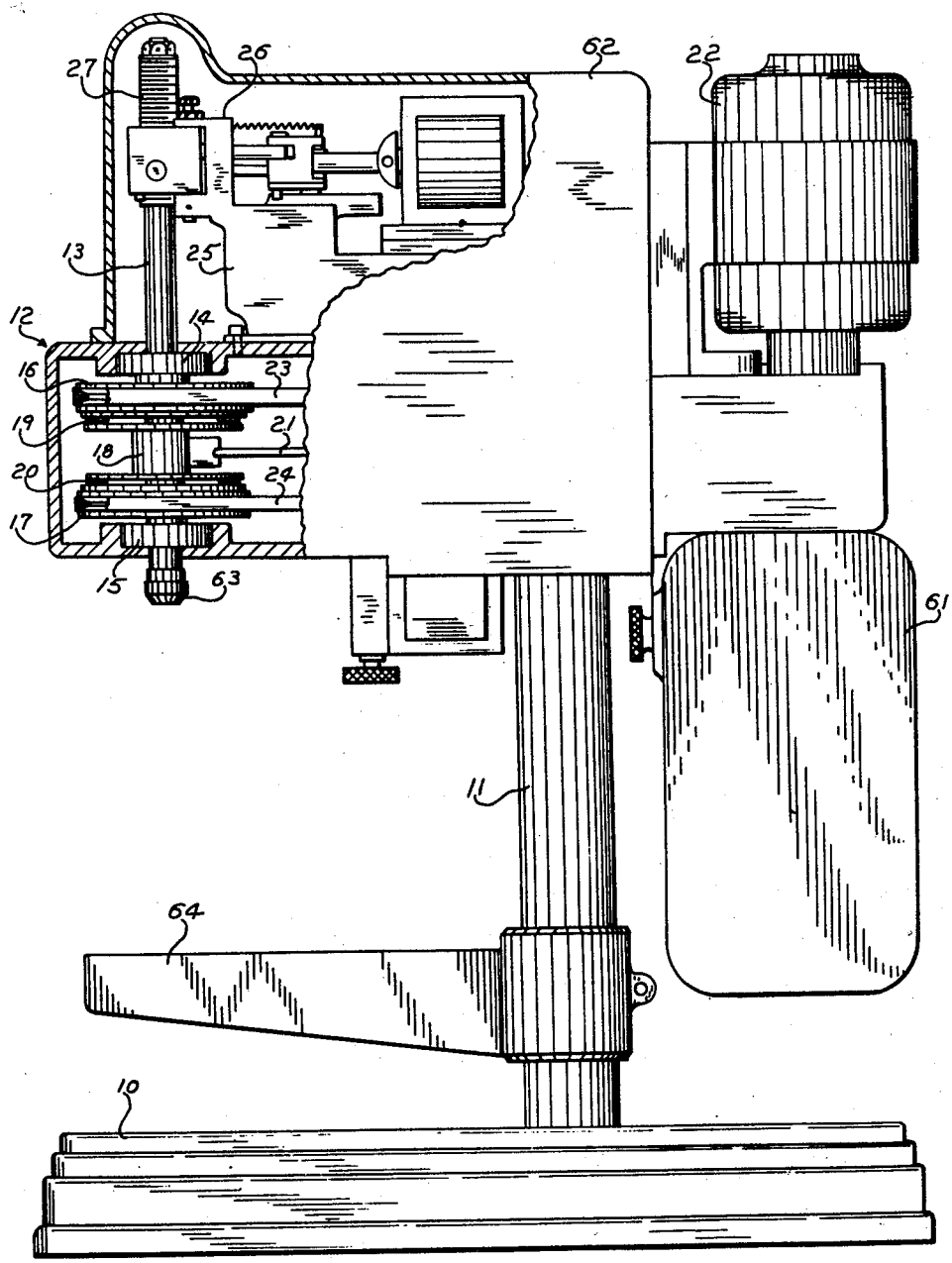
Fig. 1 is a side elevational view of a tapping machine embodying the invention, a portion of the head and cover being broken away, with certain parts removed and others shown in section, for clarity of illustration.
Figure 3:
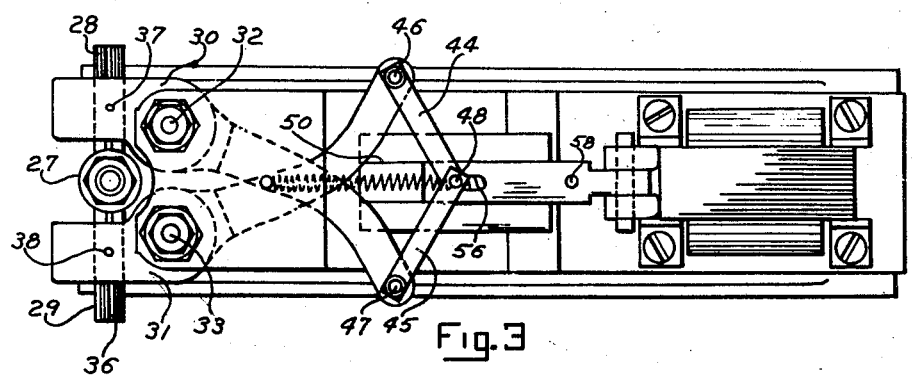
Fig. 3 is a top plan view of the apparatus illustrated in Fig. 2 showing the improved guide finger actuating means in the position in which the guide fingers are engaged with the spindle.
Figure 2:
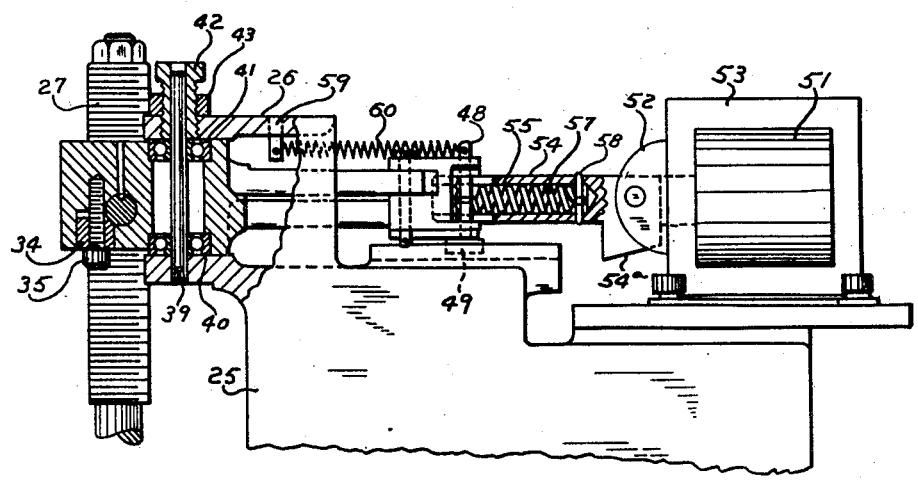
Fig. 2 is a side elevational view, of the improved guide finger actuating means with parts broken away and others shown in section.
Figure 4:
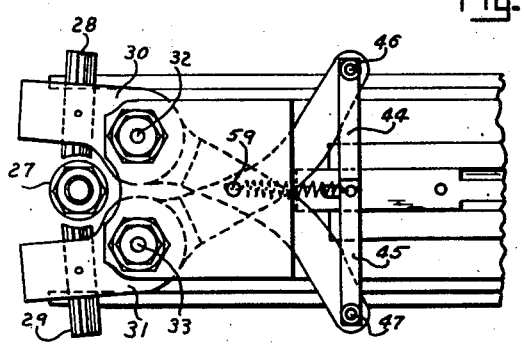
Fig. 4 is a partial top plan of the apparatus illustrated in Fig. 2 and is similar to the top plan view shown in Fig. 3 but showing the guide fingers disengaged from the spindle.
Figure 5:
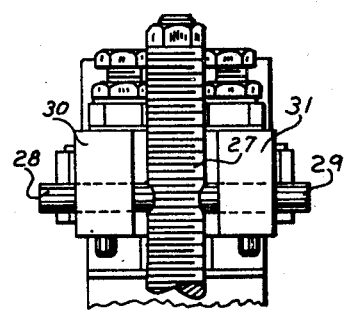
Fig. 5 is a front elevation of the structure illustrated in Fig. 2 showing the guide fingers in engagement with the threaded leader of the spindle.

In Fig. 1 of the drawings I have shown my invention as applied to a machine tool of the type known as a threading and tapping machine which is more fully disclosed in the U. S. Patent No. 2,253,493 issued to H. F. Bakewell on August 26, 1941, to which reference may be had for the conventional details of the machine. For the purpose of disclosing this invention, it is only necessary to notice that the machine tool comprises a base member 10 upon which is mounted a vertical supporting column 11 carrying on the top thereof a head or support generally designated 12, upon which are mounted the operative parts of the machine. The head or support 12 has a spindle 13 journalled therein, by means of bearings 14 and 15, for rotation and translation relative to the head. Between the said bearings the spindle carries a driving means which comprises a sleeve fixed against axial movement, pulleys 16 and 17 rotatably journalled on the sleeve, and a clutch 18, slidably mounted between the said pulleys upon the aforementioned sleeve, and keyed by means (not shown) for rotation with the spindle 13. The upper face of the clutch is adapted to cooperate with a clutch surface 19 on the lower face of pulley 16 while the lower face of the clutch cooperates with a clutch surface 20 on the upper face of pulley 17. Clutch 18 carries a rearwardly extending arm 21 for actuation by means, not shown, for selective movement into engagement with the clutch surface 19 or 20 whereby rotation will be imparted from the corresponding pulley through the clutch to the spindle.

At the rear of head 12 is mounted an electric motor 22 provided with means (not shown) for driving the belts 23 and 24 in reverse directions, the said belts being respectively carried by pulleys 16 and 17 for rotation thereof. These features are all conventional and the details thereof may be ascertained by referring to the aforesaid Bakewell patent.

Upon the upper side of the head 12 is mounted a support 25, the forward end of which carries an upstanding hollow bracket member 26 adjacent the upper portion of the spindle 13. This portion of the spindle is provided with a threaded leader 27 which may be formed integrally thereupon, or may be in the form of a sleeve affixed thereto. Cooperating with the threads of the leader 27 are threaded guide members or fingers 28 and 29 (see Figs. 2 to 5), which are adjustably supported in guide levers 30 and 31 for movement into engagement with the threaded leader 27 upon opposite sides thereof. These guide levers 30 and 31 extend through the hollow bracket 26 and are pivoted thereto and to support 25 by means of pivot pins 32 and 33, as will be described hereinafter.

The forward arms of the guide levers are provided with transversely extending openings for receiving the guide members 28 and 29 which are held in adjusted position by suitable clamping means. By way of example, this clamping means may comprise a plug 34, received in a suitable recess in the lower side of the forward arm of each guide lever, which recess communicates with the opening for the guide member. A screw 35 passes through each said plug 34 and threadedly engages the corresponding guide lever for moving the plug 34 into clamping engagement with the corresponding guide member. In order to prevent rotation of the guide members when they are adjusted and engaged by the clamping plugs, each guide member 28 and 29 has a longitudinally extending key-way in the top surface thereof and the guide levers 30, 31 carry downwardly extending key-pins 37 and 38 for reception in said key-ways.

The pivoting means for the levers 30 and 31 comprises, as mentioned above, pins 32 and 33 which are received in suitable openings in bracket 26 and support 25 and retained therein by any suitable means, as for example, by pins 39. The guide levers each have a bore for receiving the said pivot pins and these bores are recessed at the ends thereof to receive bearings 40, 41. A sleeve nut 42 passes over the top of each pivot pin 32, 33 and has external threads for cooperation with suitable threads in the top portion of the bracket 26, whereby the said sleeve nuts may be adjusted to retain the guide levers and their bearings in proper position and prevent endwise movement along the pivot pins or lost motion between the guide levers and the support while permitting the levers to rock freely. A lock nut 43 is threaded upon each sleeve nut to lock the latter in its adjusted position.

The guide levers 30 and 31, in accordance with this invention, are rigid and the rear arms thereof are curved so as to cross one above the other and extend across the support 25 to the opposite sides thereof. To the rear end of each guide lever is attached a toggle link 44 and 45 by means of suitable pivots 46 and 47. These toggle links are of substantial width and have the ends thereof forked, the outer forked end of each of the links straddling the rear end of the corresponding guide lever. The inner ends of said links have their forked ends united by a pivot pin 48, which extends downwardly below the bottom of the links and has an enlarged head 49 thereon.

The top surface of support 25 has a pair of spaced parallel upstanding surfaces thereon defining a guideway 50 into which the enlarged head 49 on pivot pin 48 extends for sliding engagement therein. This insures straight line motion of the inner pivotal connection of the toggle links with resulting equal movement of the levers 30, 31 so that the guide members 28, 29 will be moved simultaneously equal distances when said members are moved into engagement with the threaded leader 27.

A suitable actuating means for the toggle linkage is mounted upon the rear of the support 25 and in this instance comprises a solenoid 51 provided with a frame 53 and a movable armature 52. The armature has an enlarged head which abuts the frame when the armature is moved to its fully retracted position by energization of the solenoid. To the end of armature 52 is connected a longitudinally movable member 54, provided with a longitudinally extending bore 55 and transversely extending slots 56. Disposed within the bore 55 is a resilient member such as a coil spring 57 which has its inner end attached to a pin 58, extending transversely through the member 54 and the bore 55, the outer end of coil spring 57 being connected with pivot pin 48 which extends through the slots 56 of member 54. This spring forms the actuating connection between the solenoid armature and the toggle linkage and forms an important part of the invention. The strength of the spring is so chosen that, when the solenoid is energized, the pull exerted upon the pivot pin 48 will actuate the guide levers, and the guide members carried thereby, into engagement with the threaded spindle with a uniform predetermined pressure. This engagement of the guide members with the threaded leader will occur before the said pivot pin 48 reaches the outer end of slots 56. Hence, if the guide members or other parts of the device should become slightly worn, the spring 57 will allow for compensation while maintaining the same predetermined pressure between the guide members and the threaded spindle.

For returning armature 52 to its extended position and to effect disengagement of the guide members from the spindle when solenoid 51 is deenergized, the bracket 26 has fixed therein a pin 59 (see Fig. 2) to which is attached one end of a coil spring 60, the other end of which is attached to the pivot pin 48. This spring 60 returns the toggle linkage and the guide arms to the positions shown in Fig. 4 when the solenoid is deenergized, thus moving the guide fingers out of engagement with the threaded leader. This movement is limited, and the actuating mechanism stopped at the aforementioned position, by means of the engagement of a heel 54a, projecting from member 54, with the rear of the bracket member in which is provided the guideway 50.

The rear of head or support 12 (see Fig. 1) carries, depending therefrom, a housing 61 which encloses a plurality of electrical switches and relays for controlling the various operations of the machine, including energization of solenoid 51, as will be apparent from the detailed disclosure in the Bakewell Patent No. 2,253,493, mentioned above. A second housing or cover 62 is provided on top of head 12 to enclose and protect solenoid 51, the operating linkage for the guide members, and the upper end of spindle 13. The lower end of spindle 13 carries a suitable chuck 63 for attachment of the tap or die to be used in operation of the device. The work to be threaded is supported upon a suitable table 64 which may be vertically adjusted upon the column 11 to provide for workpieces of different heights.

In preparing the apparatus for operation, the cover 62 is removed and the guide members, which have previously been threaded to correspond with the threaded leader, are manually moved into contact with the threaded leader by grasping the guide levers 30, 31 and moving them against the force of return spring 60. With the guide levers so held, the guide members 28, 29 are adjusted to firmly and accurately engage the threaded leader by loosening the clamping screws 35, moving the guide members 28, 29 inwardly until the desired engagement is effected, and then retightening the clamping screws 35. This adjustment should be such that when the guide members are in firm engagement with the threaded leader, the pivot pin 48 will be in a position substantially midway of slots 56, and when the levers 30, 31 are released the spring 60 will move the toggle linkage 44, 45 and the guide levers to the position shown in Fig. 4 where the guide members will be out of engagement with respect to the threaded leader.

The cover 62 is then replaced and a suitable tap or die is inserted in the chuck member 63, the tap or die having threads corresponding to those on the threaded leader and guide members. The work support 64 is adjusted to the proper elevation and the workpiece to be operated upon is placed in proper alignment with the tap or die. The operator next closes a suitable switch (not shown) thus starting the operation of motor 22 and the corresponding rotation of pulleys 16 and 17. The subsequent operation of a further switch and a suitable relay, also not shown, energizes solenoid 51, retracting armature 52 which in turn extends spring 57 (to the position shown in Fig. 3). This moves the toggle links 44 and 45 and guide arms 30, 31 to engage the threaded guide members 28 and 29 with the threaded leader 27 on the spindle 13. The operator then closes a suitable switch which energizes solenoid operating means (not shown) to move clutch 18 into engagement with one of the pulleys 16 or 17, depending upon the desired direction of the thread to be produced. This causes rotation of spindle 13 and, by virtue of the threaded engagement between the guide members 28, 29 and the threaded leader, the spindle will be fed downwardly at a rate corresponding to the pitch of the thread to be cut with corresponding threading of the workpiece.

Automatic means (not shown, but which are fully disclosed in the Bakewell patent) are provided to terminate the feeding of the spindle in its downward direction when the work has been threaded the predetermined desired amount by moving clutch 18 into engagement with the other of the driving pulleys 16, 17. This reverses the direction of rotation of the spindle 13 and its continued rotation threads it back up through the threaded guide members thus retracting the tap or die from the workpiece. When the spindle has returned to its starting position, the clutch is disengaged thus stopping rotation and feeding of spindle 13. A new workpiece may then be placed upon table 64 and clutch 18 reengaged with one of the pulleys 16 and 17 to repeat the above described operations of advancing the spindle with corresponding threading of the workpiece to the desired extent, retraction of the spindle by reverse actuation of clutch 18, and stopping the rotation by disengaging the clutch when the spindle has again returned to its initial position. Whenever it is desired to change the threaded leader on the spindle, readjust the parts or perform similar operations, the guide fingers may be removed from engagement with the threaded leader by deenergizing solenoid 51 whereupon spring 60 will move the parts until stop 54a contacts the bracket carrying guideway 50, the parts then occupying the position shown in Fig. 4.

It will now be apparent that by employing curved rigid guide levers for the guide members, and a coil spring as a part of the actuating means for moving these guide levers, I have provided a construction by virtue of which the guide members will positively engage the threaded leader with equal predetermined pressure even though wear should occur in the threaded guide members 28, 29 or the pivots of the actuating linkages. This results in an improved operation of the threading and tapping machine by providing greater accuracy in the thread cut since the down and up movement of the spindle is constantly regulated, without lost motion, due to the uniform pressure constantly exerted between the guide members and the threaded leader. Lost motion of the levers 30, 31 in an axial direction along the pivot pins 32 and 33 is prevented by adjustment of sleeve nuts 42 into firm engagement with the top of the bearings 41. This retains the levers and their bearings in proper position upon the top surface of support 25 without preventing the rocking of the levers about their pivot pins. Thus, the improved guiding of the spindle results in repeated cutting of more accurate threads, substantially identical in character, thus preventing expensive wastage since the threading is generally the last operation performed upon a workpiece.

While I have disclosed a preferred embodiment of my invention in considerable detail it is, of course, to be understood that the invention is not limited to the exact details of construction herein described, but that numerous modifications and changes can be made by one skilled in the art. I, therefore, do not wish to be limited to the exact construction herein disclosed but only by the scope of the appended claims.

Having thus described my invention, what I claim is:

1. In a machine tool of the type described, a support, a threaded spindle journalled in said support for rotation and translation relative thereto, means to rotate the spindle, a pair of rigid levers, said levers each having a threaded portion on one arm thereof for cooperation with the threaded spindle, the length of the other arm of each of said levers being at least twice the length of the arm provided with said threaded portion, means pivoting said levers on said support for movement of the threaded portions thereof into engagement with the threaded spindle, means for rocking said levers about their pivots and means for actuating said rocking means including an actuator and a resilient connection between said actuator and said rocking means, whereby the levers are given an equalized movement to effect equal engagement of the said threaded portions with the threaded spindle and the force exerted by said actuator in preventing disengagement of said threaded portions from said spindle due to thrust action of the latter is amplified by the said levers.

2. The combination as defined in claim 1 and wherein the said means pivoting the said levers each include a separate pivot pin for each lever carried by said support, anti-friction bearings including inner and outer races, the said outer races of said bearings being carried by said lever and prevented from movement axially of said pivot pin, the said inner races being carried by said pin, and an adjustable member cooperatively associated with said inner races for exerting an axial force tending to move said inner races towards each other thereby preventing lost motion in the pivoting means for the said levers.

3. In a machine tool of the type described, a support, a threaded spindle journaled in said support for rotation and translation relative thereto, means to rotate said spindle, a pair of rigid levers, said levers each having a threaded portion on one arm thereof for cooperation with the threaded spindle, the length of the other arm of each of said levers being at least twice the length of the arm provided with said threaded portion, means pivoting said levers on the support for movement into threaded engagement with said spindle, adjustable means carried by said support for preventing movement of the levers along the axis of the pivoting means, a toggle linkage connected to said levers, guide means on said support cooperating with the common pivot of said toggle linkage to guide the said common pivot in straight line movement, and means for actuating said toggle linkage including an actuator and a resilient connection between said actuator and said toggle linkage, whereby the levers are given an equalized movement to effect equal engagement of the said threaded portions with the threaded spindle and the force exerted by said actuator in preventing disengagement of said threaded portions from said spindle due to thust action of the latter is amplified by the said levers.

4. In a machine tool of the type described, a support, a threaded spindle journaled in said support for rotation and translation relative thereto, means to rotate said spindle, a pair of rigid levers, said levers each having a threaded portion for cooperation with the threaded spindle, means pivoting said levers on the support for movement into threaded engagement with the threaded spindle, a link pivoted to each lever, pivotal connecting means joining said links, guide means on said support cooperating with said pivotal connecting means for guiding the latter in straight line movement, and means for moving said pivotal connecting means including an actuator and a resilient connection between said actuator and said pivotal connecting means, whereby the levers are given an equalized movement to engage the threaded spindle with equal predetermined pressures.

5. The combination as defined in claim 4 and further comprising, a spring and means to connect said spring to said support and said pivotal connecting means to act in opposition to the resilient connection for disengaging the levers from the spindle when the actuator releases the tension on the resilient connection.

6. In a machine tool of the type described, a support, a threaded spindle journaled in said support for rotation and translation relative thereto, means to rotate the spindle, a pair of rigid levers having arms of unequal lengths, said levers each having a threaded portion on the shorter arm thereof for cooperation with the threaded spindle, means pivoting said levers on said support for movement of said threaded portions into engagement with the threaded spindle, the longer arms of the levers extending across the support to position the said longer arms on opposite sides of the spindle from the positions occupied by the shorter arms, means connected to the said longer arms for rocking the levers equal distances about their pivots, and means for actuating said rocking means including an actuator and a resilient connection between said actuator and said rocking means, whereby the levers are given an equalized movement into engagement with the threaded spindle and are held in equal predetermined contact therewith.

7. In a machine tool of the type described, a support, a spindle journalled to said support for rotation and translation relative thereto, means to rotate said spindle, a guide thread on said spindle, a pair of rigid levers having arms of unequal lengths, means pivoting said levers on the support for movement in a plane perpendicular to the spindle on opposite sides thereof, the longer arm of each lever being curved and extending to the side of said support opposite from the point of pivot, a threaded guide member attached to the shorter arm of each lever for movement into engagement with the threads on the spindle, a toggle linkage connected to the longer arms of the levers, a solenoid, a movable armature actuated by said solenoid, and a spring connected between said armature and the toggle linkage for moving the toggle linkage and the levers to bring the threaded guide members into engagement with the guide thread on the spindle and hold the said guide members in equal predetermined contact with said guide thread when the solenoid is energized, whereby said threaded guide members will effect translation of the spindle during rotation thereof.

8. In a machine tool of the type described, a support, a threaded spindle journalled in said support for rotation and translation relative thereto, means to rotate said spindle, a pair of rigid levers, said levers each having a threaded portion on one arm thereof, means pivoting said levers on the support for movement of the threaded portions thereof into and out of threaded engagement with said spindle, the opposite arms of said levers each extending across the support to opposite sides of the spindle from the positions of the threaded arms, a link connected to each of said opposite arms, guide means on said support, a pivotal connection joining said links together and including an extension cooperating with said guide means for guiding the said pivotal connection in straight line movement, and a common actuating means connected with said pivotal connection, whereby movement of the links in one direction effects movement of the threaded arms of said levers to engage the threaded spindle.

9. An apparatus as defined in claim 8 and wherein the said actuating means includes an actuator and a resilient connection between said actuator and the said pivotal connection.

STERLING F. WINCHELL.

REFERENCES CITED

The following references are of record in the file of this patent:

UNITED STATES PATENTS

| Number | Name | Date |
|---|---|---|
| 366,774 | Isbell | July 19, 1887 |
| 677,136 | Krastin | Jan. 25, 1901 |
| 685,426 | Moser | Oct. 29, 1901 |
| 1,264,414 | Mahoney | Apr. 30, 1918 |
| 1,412,272 | Creveling | Apr. 11, 1922 |
| 1,459,656 | Cornell | June 19, 1923 |
| 2,118,401 | Good | May 24, 1938 |
| 2,127,345 | Roualet | Aug. 16, 1938 |
| 2,253,492 | Bakewell | Aug. 26, 1941 |
| 2,257,364 | Bakewell | Sept. 30, 1941 |
| 2,286,715 | Cheever | June 16, 1942 |